US008901020B2

(12) United States Patent
Li

(10) Patent No.: US 8,901,020 B2
(45) Date of Patent: Dec. 2, 2014

(54) GLASS COMPOSITIONS AND FIBERS MADE THEREFROM

(75) Inventor: Hong Li, Sewickley, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 155 days.

(21) Appl. No.: 13/606,493

(22) Filed: Sep. 7, 2012

(65) Prior Publication Data

US 2013/0244858 A1    Sep. 19, 2013

Related U.S. Application Data

(60) Provisional application No. 61/532,840, filed on Sep. 9, 2011, provisional application No. 61/534,041, filed on Sep. 13, 2011.

(51) Int. Cl.
| | |
|---|---|
| *C03C 3/087* | (2006.01) |
| *C03C 13/00* | (2006.01) |
| *C03C 13/06* | (2006.01) |
| *C03C 3/112* | (2006.01) |

(52) U.S. Cl.
CPC ............... *C03C 13/00* (2013.01); *C03C 3/112* (2013.01); *C03C 13/001* (2013.01); *C03C 3/087* (2013.01); *C03C 13/06* (2013.01)
USPC .................................. 501/70; 501/35; 501/36

(58) Field of Classification Search
CPC ...... C03C 13/00; C03C 13/001; C03C 13/06; C03C 3/087
USPC ............................................. 501/35, 36, 70
See application file for complete search history.

(56) References Cited

U.S. PATENT DOCUMENTS

| | | | |
|---|---|---|---|
| 4,199,364 A | 4/1980 | Neely | |
| 6,933,045 B2 * | 8/2005 | Tamura | 428/364 |
| 6,998,361 B2 | 2/2006 | Lewis | |
| 7,786,035 B2 * | 8/2010 | Kishimoto et al. | 501/66 |
| 7,799,713 B2 | 9/2010 | Hoffmann et al. | |
| 7,823,417 B2 | 11/2010 | Hoffmann et al. | |
| 2001/0011058 A1 | 8/2001 | Tamura | |
| 2007/0087139 A1 | 4/2007 | Creux et al. | |
| 2007/0105701 A1 * | 5/2007 | Hoffmann et al. | 501/36 |
| 2008/0009403 A1 * | 1/2008 | Hofmann et al. | 501/55 |
| 2009/0275462 A1 * | 11/2009 | Murata | 501/66 |
| 2009/0286440 A1 | 11/2009 | Lecomte et al. | |
| 2010/0029830 A1 * | 2/2010 | Fujiwara et al. | 524/492 |
| 2010/0069220 A1 | 3/2010 | McGinnis et al. | |
| 2010/0160139 A1 | 6/2010 | McGinnis | |
| 2010/0160140 A1 | 6/2010 | McGinnis | |
| 2010/0162772 A1 | 7/2010 | McGinnis et al. | |
| 2011/0000263 A1 | 1/2011 | Hoffmann et al. | |
| 2011/0003678 A1 | 1/2011 | Hoffmann et al. | |
| 2012/0129678 A1 | 5/2012 | Tang | |

FOREIGN PATENT DOCUMENTS

| | | |
|---|---|---|
| CN | 10 159 7140 | 12/2009 |
| CN | 10 173 4882 | 8/2010 |
| EP | 2 354 106 | 8/2011 |
| WO | WO 2004/110944 | 12/2004 |
| WO | WO 2006/064164 | 6/2006 |
| WO | WO 2007/055964 | 5/2007 |
| WO | WO 2010/075258 | 7/2010 |
| WO | WO 2010/075262 | 7/2010 |
| WO | WO 2011/017405 | 2/2011 |

OTHER PUBLICATIONS

Derwent Abstract 2010-J06670, abstract of CN 101734862 A, Jun. 16, 2010.*
Glass Fiber, Chapter 17—p. 583-84, Handbook of Glass Materials, (Chengyu & Ying, Eds.), 2006, Chemical Industry Publisher.
Liu, J. et al., Study on Preparation and Properties of New High Strength Glass Fibers, Functional Materials, 2010, 41(7):1290-1293.
Loewenstein, The Manufacturing Technology of Continuous Glass Fibers—4.2. Glass Compositions, Glass Science and Technology, 6, pp. 30-36.
Patent Cooperation Treaty, International Search Report and Written Opinion, International Application No. PCT/US2012/054113, dated Apr. 4, 2013.
Li, H. et al., Alkaline Earth Aluminosilicate Glass: Route to High Modulus Fiber Reinforced Composites, International Fiber Glass Symposia, RWTH Aachen University, Aachen, Germany Oct. 16-19, 2012.
Patent Cooperation Treaty, International Preliminary Report on Patentability, International Application No. PCT/US2012/054113, mailed Mar. 20, 2014.

* cited by examiner

*Primary Examiner* — Karl Group
*Assistant Examiner* — Elizabeth A Bolden
(74) *Attorney, Agent, or Firm* — Andrew C. Siminerio

(57) ABSTRACT

Embodiments of the present invention relate to glass compositions, glass fibers formed from such compositions, and related products. In one embodiment, a glass composition comprises 58-62 weight percent $SiO_2$, 14-17 weight percent $Al_2O_3$, 14-17.5 weight percent CaO, and 6-9 weight percent MgO, wherein the amount of $Na_2O$ is 0.09 weight percent or less.

19 Claims, No Drawings

GLASS COMPOSITIONS AND FIBERS MADE THEREFROM

CROSS-REFERENCE TO RELATED APPLICATIONS

This application claims priority to U.S. Provisional Patent Application Ser. No. 61/532,840, filed on Sep. 9, 2011 and to U.S. Provisional Patent Application Ser. No. 61/534,041, filed on Sep. 13, 2011, the entire disclosures of each being hereby incorporated by reference.

FIELD OF THE INVENTION

The present invention relates to glass compositions and, in particular, to glass compositions for forming fibers.

BACKGROUND

Glass fibers have been used to reinforce various polymeric resins for many years. Some commonly used glass compositions for use in reinforcement applications include the "E-glass" and "D-glass" families of compositions. Another commonly used glass composition is commercially available from AGY (Aiken, S.C.) under the trade name "S-2 Glass."

In reinforcement and other applications, certain mechanical properties of glass fibers or of composites reinforced with glass fibers can be important. However, in many instances, the manufacture of glass fibers having improved mechanical properties (e.g., higher strength, higher modulus, etc.) can result in higher costs due, for example, due to increased batch material costs, increased manufacturing costs, or other factors. For example, the aforementioned "S-2 Glass" has improved mechanical properties as compared to conventional E-glass but costs significantly more as well as a result of substantially higher temperature and energy demands for batch-to-glass conversion melt fining, and fiber drawing. Fiber glass manufacturers continue to seek glass compositions that can be used to form glass fibers having desirable mechanical properties in a commercial manufacturing environment.

SUMMARY

Various embodiments of the present invention relate generally to glass compositions, glass fibers formed from such glass compositions, and various products incorporating one or more glass fibers.

In one exemplary embodiment, a glass composition comprises 58-62 weight percent $SiO_2$, 14-17 weight percent $Al_2O_3$, 14-17.5 weight percent CaO, and 6-9 weight percent MgO, wherein the amount of $Na_2O$ is 0.09 weight percent or less. A glass composition, in another exemplary embodiment, comprises 58-62 weight percent $SiO_2$, 14-17 weight percent $Al_2O_3$, 14-16 weight percent CaO, 6-9 weight percent MgO, 0-1 weight percent $Na_2O$, 0-0.2 weight percent $K_2O$, 0-1 weight percent $Li_2O$, 0-0.5 weight percent $B_2O_3$, 0-0.44 weight percent $Fe_2O_3$, 0-0.1 weight percent $F_2$, 0-1 weight percent $TiO_2$, 0-1 weight percent $ZrO_2$, and 0-5 weight percent other constituents. In another exemplary embodiment, a glass composition comprises 60-62 weight percent $SiO_2$, 14.5-16 weight percent $Al_2O_3$, 14.5-17.5 weight percent CaO, and 6-7.5 weight percent MgO, wherein the amount of $Na_2O$ is 0.09 weight percent or less. A glass composition, in another exemplary embodiment, comprises 60-62 weight percent $SiO_2$, 15-16 weight percent $Al_2O_3$, 14.5-16.5 weight percent CaO, 6.5-7.5 weight percent MgO, 0.09 weight percent or less $Na_2O$, 0-0.1 weight percent $K_2O$, 0-1 weight percent $Li_2O$, 0-0.1 weight percent $B_2O_3$, 0-0.44 weight percent $Fe_2O_3$, 0-0.1 weight percent $F_2$, 0-0.75 weight percent $TiO_2$, 0-0.1 weight percent $ZrO_2$, and 0-5 weight percent other constituents.

In some embodiments, glass compositions of the present invention are substantially free of $Na_2O$. Glass compositions of the present invention, in some embodiments, are substantially free of $B_2O_3$. In some embodiments, the (MgO+CaO) content in glass compositions is greater than about 21.5 weight percent. Glass compositions, in some embodiments, can have a CaO/MgO ratio on a weight percent basis that is greater than about 2.0. In some embodiments, glass compositions comprise 0-1 weight percent $K_2O$. Glass compositions, in some embodiments, comprise 0.09 weight percent $K_2O$ or less. Glass compositions, in some embodiments, comprise 0-2 weight percent $Li_2O$. In some embodiments of glass compositions, the ($Na_2O+K_2O+Li_2O$) content is less than about 1 weight percent.

Glass compositions of the present invention, in some embodiments, are fiberizable such that the compositions can be used to form a plurality of glass fibers. In some embodiments, glass compositions of the present invention can have a liquidus temperature of less than about 1250° C. Glass compositions of the present invention, in some embodiments, can have a forming temperature of less than about 1300° C. In some embodiments, the difference between the forming temperature and the liquidus temperature of the glass compositions is at least 50° C.

Some embodiments of the present invention relate to one or more glass fibers formed from a glass composition of the present invention. In some embodiments, a glass fiber can have a Young's modulus greater than about 80 GPa. A glass fiber, in some embodiments, can have a Young's modulus greater than about 85 GPa. A glass fiber, in some embodiments, can have a Young's modulus greater than about 87 GPa.

Some embodiments of the present invention to polymeric composites. In some embodiments, a polymeric composite comprises a polymeric material (e.g., a thermoplastic or thermosetting resin) and at least one glass fiber formed from any of the glass compositions described or disclosed herein.

These and other embodiments are discussed in greater detail in the detailed description which follows.

DETAILED DESCRIPTION

Unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

The present invention relates generally to glass compositions. In one aspect, the present invention provides glass fibers formed from glass compositions described herein. In some embodiments, glass fibers of the present invention can have improved mechanical properties, such as Young's modulus, as compared to conventional E-glass fibers.

In one embodiment, the present invention provides a glass composition comprising 52-67 weight percent $SiO_2$, 10.5-20 weight percent $Al_2O_3$, 10.5-19 weight percent CaO, 4-14 weight percent MgO, 0-3 weight percent $Na_2O$, 0-1 weight percent $K_2O$, 0-2 weight percent $Li_2O$, 0-4 weight percent $B_2O_3$, 0-0.44 weight percent $Fe_2O_3$, 0-0.5 weight percent $F_2$, 0-2 weight percent $TiO_2$, 0-2 weight percent $ZrO_2$, and 0-5 weight percent other constituents.

Some embodiments of the present invention can be characterized by the amount of $SiO_2$ present in the glass compositions. $SiO_2$ can be present, in some embodiments, in an amount between about 52 and about 67 weight percent. In some embodiments, $SiO_2$ can be present in an amount between about 55 and about 67 weight percent. $SiO_2$ can be present in an amount between about 58 and about 62 weight percent in some embodiments. In some embodiments, $SiO_2$ can be present in an amount between about 60 and about 62 weight percent.

Some embodiments of the present invention can be characterized by the amount of $Al_2O_3$ present in the glass compositions. $Al_2O_3$ can be present, in some embodiments, in an amount between about 10.5 and about 20 weight percent. In some embodiments, $Al_2O_3$ can be present in an amount between about 11 and about 19 weight percent. $Al_2O_3$ can be present in an amount between about 14 and about 17 weight percent in some embodiments. In some embodiments, $Al_2O_3$ can be present in an amount between about 14.5 and about 16 weight percent. $Al_2O_3$ can be present in an amount between about 15 and about 16 weight percent in some embodiments.

Some embodiments of the present invention can be characterized by the amount of CaO present in the glass compositions. CaO can be present, in some embodiments, in an amount between about 10.5 and about 19 weight percent. In some embodiments, CaO can be present in an amount between about 11 and about 18 weight percent. CaO can be present in an amount between about 14 and about 17.5 weight percent in some embodiments. In some embodiments, CaO can be present in an amount between about 14.5 and about 17.5 weight percent. CaO can be present in an amount between about 14 and about 16 weight percent in some embodiments. In some embodiments, CaO can be present in an amount between about 14.5 and about 16.5 weight percent.

Some embodiments of the present invention can be characterized by the amount of MgO present in the glass compositions. MgO can be present, in some embodiments, in an amount between about 4 and about 14 weight percent. In some embodiments, MgO can be present in an amount between about 4.5 and about 13 weight percent. MgO can be present in an amount between about 6 and about 9 weight percent in some embodiments. In some embodiments, MgO can be present in an amount between about 6 and about 7.5 weight percent. MgO can be present in an amount between about 6.5 and about 7.5 weight percent in some embodiments.

In some embodiments, compositions of the present invention can be characterized by (MgO+CaO) content. The (MgO+CaO) content in some embodiments of the present invention can be greater than about 21.5 weight percent. In some embodiments, the (MgO+CaO) content can be greater than about 21.7 weight percent. The (MgO+CaO) content can be greater than about 22 weight percent in some embodiments.

In some embodiments, compositions of the present invention can be characterized by the total alkaline earth oxide (RO) content (i.e., MgO+CaO+BaO+SrO). The RO content in some embodiments of the present invention can be greater than about 21.5 weight percent. In some embodiments, the RO content can be greater than about 21.7 weight percent. The RO content can be greater than about 22 weight percent in some embodiments.

Some embodiments of the present invention can be characterized by the amount of MgO relative to CaO which can be expressed as CaO/MgO (weight percent of CaO divided by weight percent of MgO). In some embodiments, CaO/MgO can be greater than about 2.0. The CaO/MgO ratio can be greater than about 2.1 in some embodiments.

Some embodiments of the present invention can be characterized by the amount of $Na_2O$ present in the glass compositions. $Na_2O$ can be present, in some embodiments, in an amount between about 0 and about 3 weight percent. In some embodiments, $Na_2O$ can be present in an amount between about 0 and about 2.5 weight percent. $Na_2O$ can be present in an amount less than about 1 weight percent in some embodiments. In some embodiments, $Na_2O$ can be present in an amount of 0.09 weight percent or less. In some embodiments, glass compositions of the present invention can be substantially free of $Na_2O$, meaning that any $Na_2O$ present in the glass composition would result from $Na_2O$ being present as a trace impurity in a batch material.

Some embodiments of the present invention can be characterized by the amount of $K_2O$ present in the glass compositions. $K_2O$ can be present, in some embodiments, in an amount between about 0 and about 1 weight percent. In some embodiments, $K_2O$ can be present in an amount less than about 0.2 weight percent. $K_2O$ can be present in an amount of 0.09 weight percent or less in some embodiments. In some embodiments, glass compositions of the present invention can be substantially free of $K_2O$, meaning that any $K_2O$ present in the glass composition would result from $K_2O$ being present as a trace impurity in a batch material.

Some embodiments of the present invention can be characterized by the amount of $Li_2O$ present in the glass compositions. $Li_2O$ can be present, in some embodiments, in an amount between about 0 and about 2 weight percent. In some embodiments, $Li_2O$ can be present in an amount between about 0 and about 1 weight percent. $Li_2O$ can be present in an amount less than about 0.7 weight percent in some embodiments.

In some embodiments, compositions of the present invention can be characterized by the total alkali metal oxide ($R_2O$) content (i.e., $Na_2O+K_2O+Li_2O$). The $R_2O$ content in some embodiments of the present invention can be between about 0.1 and about 3 weight percent. In some embodiments, the $R_2O$ content can be less than about 1.5 weight percent. The $R_2O$ content can be less than about 1 weight percent in some embodiments. In some embodiments, the $Na_2O$ content in the glass composition can be less than the $K_2O$ content and/or the $Li_2O$ content.

Some embodiments of the present invention can be characterized by the amount of $B_2O_3$ present in the glass compositions. $B_2O_3$ can be present, in some embodiments, in an amount between about 0 and about 4 weight percent. In some embodiments, $B_2O_3$ can be present in an amount less than about 1 weight percent. $B_2O_3$ can be present, in some embodiments, in an amount less than about 0.5 weight percent. In some embodiments, glass compositions of the present invention can be substantially free of $B_2O_3$, meaning that any $B_2O_3$ present in the glass composition would result from $B_2O_3$ being present as a trace impurity in a batch material.

Some embodiments of the present invention can be characterized by the amount of $Fe_2O_3$ present in the glass compositions. $Fe_2O_3$ can be present, in some embodiments, in an amount between about 0 and about 0.44 weight percent. In some embodiments, $Fe_2O_3$ can be present in an amount between about 0 and about 0.4 weight percent. $Fe_2O_3$ can be present in an amount between about 0.2 and about 0.3 weight percent in some embodiments.

Some embodiments of the present invention can be characterized by the amount of $F_2$ present in the glass compositions. $F_2$ can be present, in some embodiments, in an amount between about 0 and about 0.5 weight percent. In some embodiments, $F_2$ can be present in an amount between about 0 and about 0.1 weight percent. $F_2$ can be present in an amount less than about 0.1 weight percent in some embodiments.

Some embodiments of the present invention can be characterized by the amount of $TiO_2$ present in the glass compositions. $TiO_2$ can be present, in some embodiments, in an amount between about 0 and about 2 weight percent. In some embodiments, $TiO_2$ can be present in an amount between about 0 and about 1 weight percent. $TiO_2$ can be present in an amount between about 0.2 and about 0.75 weight percent in some embodiments. In some embodiments, $TiO_2$ can be present in an amount less than about 0.75 weight percent.

Some embodiments of the present invention can be characterized by the amount of $ZrO_2$ present in the glass compositions. $ZrO_2$ can be present, in some embodiments, in an amount between about 0 and about 2 weight percent. In some embodiments, $ZrO_2$ can be present in an amount between about 0 and about 1 weight percent. $ZrO_2$ can be present in an amount less than about 0.01 weight percent in some embodiments. In some embodiments, glass compositions of the present invention can be substantially free of $ZrO_2$, meaning that any $ZrO_2$ present in the glass composition would result from $ZrO_2$ being present as a trace impurity in a batch material.

One advantageous aspect of the invention present in some of the embodiments is reliance upon constituents that are conventional in the fiber glass industry and avoidance of substantial amounts of constituents whose raw material sources are costly. For this aspect of the invention, constituents in addition to those explicitly set forth in the compositional definition of the glasses of the present invention may be included even though not required, but in total amounts no greater than 5 weight percent. These optional constituents include melting aids, fining aids, colorants, trace impurities and other additives known to those of skill in glassmaking. For example, no BaO is required in the compositions of the present invention, but inclusion of minor amounts of BaO (e.g., up to about 1 weight percent) would not be precluded. Likewise, major amounts of ZnO are not required in the present invention, but in some embodiments minor amounts (e.g., up to about 2.0 weight percent) may be included. In those embodiments of the invention in which optional constituents are minimized, the total of optional constituents is no more than 2 weight percent, or no more than 1 weight percent. Alternatively, some embodiments of the invention can be said to consist essentially of the named constituents.

In some embodiments, the present invention provides a glass composition comprising 55-67 weight percent $SiO_2$, 11-19 weight percent $Al_2O_3$, 11-18 weight percent CaO, 4.5-13 weight percent MgO, 0-2.5 weight percent $Na_2O$, 0-1 weight percent $K_2O$, 0-2 weight percent $Li_2O$, 0-1 weight percent $B_2O_3$, 0-0.44 weight percent $Fe_2O_3$, 0-0.1 weight percent $F_2$, 0-1 weight percent $TiO_2$, 0-1 weight percent $ZrO_2$, and 0-5 weight percent other constituents. In some further embodiments, the amount of $Na_2O$ can be 0.09 weight percent or less. In some embodiments, such glass compositions can be substantially free of $Na_2O$. In some further embodiments, the (MgO+CaO) content can be greater than about 21.5 weight percent, greater than 21.7 weight percent in others, and greater than about 22 weight percent in others. The ratio of CaO to MgO or CaO/MgO, in some embodiment, can be greater than 2.0, and can be greater than about 2.1 in others. In some embodiments, glass compositions can be substantially free of $B_2O_3$.

In some embodiments, the present invention provides a glass composition comprising 58-62 weight percent $SiO_2$, 14-17 weight percent $Al_2O_3$, 14-17.5 weight percent CaO, 6-9 weight percent MgO, 0-1 weight percent $Na_2O$, 0-0.2 weight percent $K_2O$, 0-1 weight percent $Li_2O$, 0-0.5 weight percent $B_2O_3$, 0-0.44 weight percent $Fe_2O_3$, 0-0.1 weight percent $F_2$, 0-1 weight percent $TiO_2$, 0-1 weight percent $ZrO_2$, and 0-5 weight percent other constituents. In some further embodiments, the amount of $Na_2O$ can be 0.09 weight percent or less. In some embodiments, such glass compositions can be substantially free of $Na_2O$. In some further embodiments, the (MgO+CaO) content can be greater than about 21.5 weight percent, greater than 21.7 weight percent in others, and greater than about 22 weight percent in others. The ratio of CaO to MgO or CaO/MgO, in some embodiment, can be greater than 2.0, and can be greater than about 2.1 in others. In some embodiments, glass compositions can be substantially free of $B_2O_3$.

In some embodiments, the present invention provides a glass composition comprising 58-62 weight percent $SiO_2$, 14-17 weight percent $Al_2O_3$, 14-16 weight percent CaO, 6-9 weight percent MgO, 0-1 weight percent $Na_2O$, 0-0.2 weight percent $K_2O$, 0-1 weight percent $Li_2O$, 0-0.5 weight percent $B_2O_3$, 0-0.44 weight percent $Fe_2O_3$, 0-0.1 weight percent $F_2$, 0-1 weight percent $TiO_2$, 0-1 weight percent $ZrO_2$, and 0-5 weight percent other constituents. In some further embodiments, the amount of $Na_2O$ can be 0.09 weight percent or less. In some embodiments, such glass compositions can be substantially free of $Na_2O$. In some further embodiments, the (MgO+CaO) content can be greater than about 21.5 weight percent, greater than 21.7 weight percent in others, and greater than about 22 weight percent in others. The ratio of CaO to MgO or CaO/MgO, in some embodiment, can be greater than 2.0, and can be greater than about 2.1 in others. In some embodiments, glass compositions can be substantially free of $B_2O_3$.

In some embodiments, the present invention provides a glass composition comprising 60-62 weight percent $SiO_2$, 14.5-16 weight percent $Al_2O_3$, 14.5-17.5 weight percent CaO, 6-7.5 weight percent MgO, 0.09 weight percent or less $Na_2O$, 0-0.1 weight percent $K_2O$, 0-1 weight percent $Li_2O$, 0-0.1 weight percent $B_2O_3$, 0-0.44 weight percent $Fe_2O_3$, 0-0.1 weight percent $F_2$, 0-0.75 weight percent $TiO_2$, 0-0.1 weight percent $ZrO_2$, and 0-5 weight percent other constituents. In some further embodiments, such glass compositions can be substantially free of $Na_2O$. In some further embodiments, the (MgO+CaO) content can be greater than about 21.5 weight percent, greater than 21.7 weight percent in others, and greater than about 22 weight percent in others. The ratio of CaO to MgO or CaO/MgO, in some embodiment, can be greater than 2.0, and can be greater than about 2.1 in others. In some embodiments, glass compositions can be substantially free of $B_2O_3$.

In some embodiments, the present invention provides a glass composition comprising 60-62 weight percent $SiO_2$, 15-16 weight percent $Al_2O_3$, 14.5-16.5 weight percent CaO, 6.5-7.5 weight percent MgO, 0.09 weight percent or less $Na_2O$, 0-0.1 weight percent $K_2O$, 0-1 weight percent $Li_2O$, 0-0.1 weight percent $B_2O_3$, 0-0.44 weight percent $Fe_2O_3$, 0-0.1 weight percent $F_2$, 0-0.75 weight percent $TiO_2$, 0-0.1 weight percent $ZrO_2$, and 0-5 weight percent other constituents. In some further embodiments, such glass compositions can be substantially free of $Na_2O$. In some further embodiments, the (MgO+CaO) content can be greater than about 21.5 weight percent, greater than 21.7 weight percent in others, and greater than about 22 weight percent in others. The ratio of CaO to MgO or CaO/MgO; in some embodiment, can be greater than 2.0, and can be greater than about 2.1 in others. In some embodiments, glass compositions can be substantially free of $B_2O_3$.

Glass compositions, according to some embodiments of the present invention are fiberizable. In some embodiments, glass compositions of the present invention have forming temperatures ($T_F$) of less than about 1300° C. As used herein, the term "forming temperature" means the temperature at which the glass composition has a viscosity of 1000 poise (or "log 3 temperature"). In some embodiments, glass compositions of the present invention are fiberizable at the forming temperature. Glass compositions according to some embodiments of the present invention have forming temperatures between about 1200° C. and about 1300° C. In some embodiments, glass compositions of the present invention have forming temperatures ranging from about 1240° C. to about 1280° C.

Moreover, in some embodiments, glass compositions of the present invention have liquidus temperatures ($T_L$) less than about 1250° C. Glass compositions, according to some embodiments of the present invention, have liquidus temperatures ranging from about 1200° C. to about 1240° C.

In some embodiments, the difference between the forming temperature and the liquidus temperature of a glass composition of the present invention ranges from about 35° C. to greater than 60° C. In some embodiments, the difference between the forming temperature and the liquidus temperature of a glass composition of the present invention is at least 50° C.

In some embodiments, glass compositions of the present invention have a molten density at the forming temperature ranging from 2.5 g/cm² to 2.7 g/cm². In some embodiments, glass compositions of the present invention have molten density ranging from 2.50 g/cm² to 2.65 g/cm².

As provided herein, glass fibers can be formed from some embodiments of the glass compositions of the present invention. In some embodiments, glass fibers of the present invention can exhibit improved mechanical properties relative to glass fibers formed from E-glass. For example, in some embodiments, fibers formed from glass compositions of the present invention can have a Young's modulus (E) greater than about 75 GPa. In some embodiments, glass fibers of the present invention can have a Young's modulus greater than about 80 GPa. In some embodiments, glass fibers of the present invention can have a Young's modulus greater than about 85 GPa. In some embodiments, glass fibers of the present invention can have a Young's modulus greater than about 87 GPa. Unless otherwise stated, Young's modulus values discussed herein are determined using the procedure set forth in the Examples section below.

In some embodiments, glass fibers of the present invention can have a tensile strength greater than 3300 MPa. In some embodiments, glass fibers of the present invention can have a tensile strength greater than about 3600 MPa. Unless otherwise stated, tensile strength values are determined using the procedure set forth in the Examples section.

In some embodiments, specific strength or specific modulus of glass fibers of the present invention can be important. Specific strength refers to the tensile strength in $N/m^2$ divided by the specific weight in $N/m^3$. Specific modulus refers to the Young's modules in $N/m^2$ divided by the specific weight in $N/m^3$. In some embodiments, glass fibers of the present invention can have a specific strength greater than $13 \times 10^4$ m. Glass fibers, in some embodiments of the present invention, can have a specific strength greater than about $14 \times 10^4$ m. In some embodiments, glass fibers of the present invention can have a specific modulus greater than about $3.35 \times 10^6$ m. These values are improvements over E-glass fibers which are understood to typically have a specific strength of $11.8 \times 10^4$ m and a specific modulus of $3.16 \times 10^6$ m.

Commercial glass fibers of the present invention can be prepared in the conventional manner well known in the art, by blending the raw materials used to supply the specific oxides that form the composition of the fibers. For example, typically sand is used for $SiO_2$, clay for $Al_2O_3$, lime or limestone for CaO, and dolomite for MgO and some of the CaO.

As noted above, the glass can include other additives that are added to aid the glass melting and fiber drawing processes without adversely affecting glass or glass fiber mechanical properties or specific mechanical properties. It is also possible for the glass to contain small amounts of impurities that come from batch ingredients. For example, sulfate (expressed as $SO_3$) may also be present as a refining agent. Small amounts of impurities may also be present from raw materials or from contamination during the melting processes, such as SrO, BaO, $Cl_2$, $P_2O_5$, $Cr_2O_3$, or NiO (not limited to these particular chemical forms). Other refining agents and/or processing aids may also be present such as $As_2O_3$, MnO, $MnO_2$, $Sb_2O_3$, or $SnO_2$, (not limited to these particular chemical forms). These impurities and refining agents, when present, are each typically present in amounts less than 0.5% by weight of the total glass composition. Optionally, elements from rare earth group of the Periodic Table of the Elements may be added to compositions of the present invention, including atomic numbers 21 (Sc), 39 (Y), and 57 (La) through 71 (Lu). These may serve as either processing aids or to improve the electrical, physical (thermal and optical), mechanical, and chemical properties of the glasses. The rare earth additives may be included with regard for the original chemical forms and oxidization states. Adding rare earth elements is considered optional, particularly in those embodiments of the present invention having the objective of minimizing raw material cost, because they would increase batch costs even at low concentrations. In any case, their costs would typically dictate that the rare earth components (measured as oxides), when included, be present in amounts no greater than about 0.1-3.0% by weight of the total glass composition.

Glass fibers according to the various embodiments of the present invention can be formed using any process known in the art for forming glass fibers, and more desirably, any process known in the art for forming essentially continuous glass fibers. For example, although not limiting herein, the glass fibers according to non-limiting embodiments of the present invention can be formed using direct-melt or indirect-melt fiber forming methods. These methods are well known in the art and further discussion thereof is not believed to be necessary in view of the present disclosure. See, e.g., K. L. Loewenstein, *The Manufacturing Technology of Continuous Glass Fibers*, $3^{rd}$ Ed., Elsevier, N.Y., 1993 at pages 47-48 and 117-234.

Although not limiting herein, glass fibers according to some embodiments of the present invention can be useful in structural reinforcement applications. In some embodiments, glass fibers of the present invention can be used in the reinforcement of polymers including thermoplastics and thermosets. In some embodiments, glass fibers formed from glass compositions of the present invention can be used in reinforcement applications. For example, some embodiments of the present invention having relatively high specific strength or relatively high specific modulus (particularly, when compared to E-glass fibers) may be desirable in applications where there is a desire to increase mechanical properties or product performance while reducing the overall weight of the composite. Some examples of potential uses of composites according to some embodiments of the present invention include, without limitation, wind energy (e.g., windmill blades), ballistics armor, aerospace or aviation applications (e.g., interior floors of planes), and others. For example, in some embodiments, composites comprising glass fibers according to some embodiments of the present invention can have a higher modulus than existing standard E-glass reinforced composites, and can be useful in making a new generation of wind turbine blades and other applications driven by mechanical performance.

In various embodiments, the present invention provides a polymeric composite comprising a polymeric material and at least one glass fiber formed from any of the glass compositions described or disclosed herein. Polymeric composites according to the various embodiments of the present invention can be made by any method known in the art for making polymeric composites. For example, in one embodiment, polymeric composites according to the present invention can be made by impregnating woven fabrics or non-woven fabrics or mats of glass fibers with a polymeric material and then curing the polymeric material. In another embodiment, continuous glass fibers and/or chopped glass fibers comprising glass compositions of the present invention can be disposed in the polymeric material. Depending on the identity of the polymeric material, the polymeric material can be cured subsequent to receiving the continuous or chopped glass fibers.

The invention will be illustrated through the following series of specific embodiments. However, it will be understood by one of skill in the art that many other embodiments are contemplated by the principles of the invention.

EXAMPLES

Examples 1-11

The glasses in these examples were made by melting mixtures of reagent grade chemicals in powder form in 10% Rh/Pt crucibles at the temperatures between 1500° C. and 1550° C. (2732° F.-2822° F.) for four hours. Each batch was about 1200 grams. After the 4 hour melting period, the molten glass was poured onto a steel plate for quenching. Volatile species, such as fluoride and alkali oxides, were not adjusted in the batches for their emission loss because of their low concentrations in the glasses. The compositions in the examples represent as-batched compositions. Commercial ingredients were used in preparing the glasses. In the batch calculation, special raw material retention factors were considered to calculate the oxides in each glass. The retention factors are based on years of glass batch melting and oxides yield in the glass as measured. Hence, the as-batched compositions illustrated in the invention are considered to be close to the measured compositions.

TABLE 1

|  | 1 | 2 | 3 | 4 | 5 | 6 | 7 | 8 | 9 | 10 | 11 |
|---|---|---|---|---|---|---|---|---|---|---|---|
| $SiO_2$ | 60.46 | 60.46 | 60.32 | 60.14 | 59.91 | 59.85 | 60.73 | 60.92 | 60.95 | 60.97 | 61.02 |
| $Al_2O_3$ | 15.33 | 15.27 | 15.24 | 15.19 | 15.48 | 15.70 | 15.36 | 15.40 | 15.32 | 15.32 | 15.32 |
| CaO | 14.94 | 14.97 | 14.94 | 14.89 | 15.18 | 15.07 | 14.98 | 15.02 | 15.22 | 15.23 | 15.22 |
| MgO | 7.28 | 7.00 | 7.20 | 7.49 | 7.10 | 7.04 | 7.00 | 7.02 | 6.87 | 6.87 | 6.87 |
| $Na_2O$ | 0.66 | 0.66 | 0.66 | 0.66 | 0.67 | 0.67 | 0.66 | 0.66 | 0.06 | 0.06 | 0.06 |
| $K_2O$ | 0.09 | 0.09 | 0.09 | 0.09 | 0.10 | 0.10 | 0.09 | 0.10 | 0.11 | 0.09 | 0.11 |
| $Li_2O$ | 0.20 | 0.61 | 0.60 | 0.60 | 0.61 | 0.61 | 0.61 | 0.30 | 0.61 | 0.63 | 0.643 |
| $B_2O_3$ | 0 | 0 | 0 | 0 | 0 | 0 | 0 | 0 | 0 | 0 | 0 |
| $Fe_2O_3$ | 0.31 | 0.27 | 0.27 | 0.27 | 0.28 | 0.28 | 0.28 | 0.28 | 0.27 | 0.28 | 0.27 |
| $F_2$ | 0.01 | 0.01 | 0.01 | 0.01 | 0.01 | 0.01 | 0.01 | 0.01 | 0 | 0 | 0 |
| $TiO_2$ | 0.72 | 0.65 | 0.65 | 0.65 | 0.66 | 0.66 | 0.29 | 0.29 | 0.49 | 0.52 | 0.49 |
| $ZrO_2$ | 0 | 0.01 | 0.01 | 0.01 | 0.01 | 0.01 | 0.01 | 0.01 | 0 | 0 | 0 |
| Other (e.g., $SO_3$) |  |  |  |  |  |  |  |  |  | 0.1 | 0.02 |
| MgO + CaO | 22.22 | 21.97 | 22.14 | 22.38 | 22.28 | 22.11 | 21.98 | 22.04 | 22.09 | 22.1 | 22.09 |
| CaO/MgO | 2.05 | 2.14 | 2.075 | 1.99 | 2.14 | 2.14 | 2.14 | 2.14 | 2.215 | 2.22 | 2.215 |
| $R_2O$ | 0.95 | 1.36 | 1.35 | 1.35 | 1.38 | 1.38 | 1.36 | 1.06 | 0.78 | 0.78 | .813 |
| Properties |  |  |  |  |  |  |  |  |  |  |  |
| $T_L$ (° C.) | 1207 | 1210 | 1212 | 1211 | 1208 | 1211 | 1211 | 1216 | 1213 | 1219 |  |
| $T_F$ (° C.) | 1273 | 1249 | 1260 | 1251 | 1258 | 1252 | 1270 | 1280 | 1273 | 1280 |  |
| $T_F - T_L$ (° C.) | 66 | 39 | 48 | 40 | 50 | 41 | 59 | 64 | 60 | 61 |  |
| Density (g/cm$^3$) | 2.601 | 2.61 | 2.621 | 2.621 | 2.584 | 2.585 | 2.555 | 2.542 | 2.582 | 2.65 |  |
| Strength (MPa) | 3623 | 3734 | 3537 | 3674 | 3353 | 3751 | 3696 | 3643 | 3751 |  |  |
| Specific Strength ($10^4$ m) | 14.21 | 14.60 | 13.77 | 14.30 | 13.24 | 14.81 | 14.76 | 14.62 | 14.82 |  |  |

TABLE 1-continued

| | 1 | 2 | 3 | 4 | 5 | 6 | 7 | 8 | 9 | 10 | 11 |
|---|---|---|---|---|---|---|---|---|---|---|---|
| Modulus (GPa) | 86.53 | | | | 85.6 | 86.39 | 85.42 | 83.17 | 86.4 | | |
| Specific Modulus ($10^6$ m) | 3.39 | | | | 3.38 | 3.41 | 3.41 | 3.34 | 3.41 | | |

Melt Properties

Melt viscosity as a function of temperature and liquidus temperature were determined by using ASTM Test Method C965 "Standard Practice for Measuring Viscosity of Glass Above the Softening Point," and C829 "Standard Practices for Measurement of Liquidus Temperature of Glass by the Gradient Furnace Method," respectively.

Table 1 above summarizes measured liquidus temperature ($T_L$) and reference temperature of forming ($T_F$) defined by melt viscosity of 1000 Poise for glass compositions of Examples 1-10. Glass compositions of Examples 1-10 demonstrated liquidus temperatures greater than 1200° C. The glass compositions exhibited forming temperatures between 1249° C. and 1280° C. The difference between the forming temperature and the liquidus temperature (or ΔT) for these compositions ranged from 39° C. to 66° C.

Mechanical Properties

For fiber tensile strength test, fiber samples from the glass compositions were produced from a 10Rh/90Pt single tip fiber drawing unit. Approximately, 85 grams of cullet of a given composition was fed into the bushing melting unit and conditioned at a temperature close or equal to the 100 Poise melt viscosity for two hours. The melt was subsequently lowered to a temperature close or equal to the 1000 Poise melt viscosity and stabilized for one hour prior to fiber drawing. Fiber diameter was controlled to produce an approximately 10 μm diameter fiber by controlling the speed of the fiber drawing winder. All fiber samples were captured in air without any contact with foreign objects. The fiber drawing was completed in a room with a controlled humidity of between 40 and 45% RH.

Fiber tensile strength was measured using a Kawabata KES-G1 (Kato Tech Co. Ltd., Japan) tensile strength analyzer equipped with a Kawabata type C load cell. Fiber samples were mounted on paper framing strips using a resin adhesive. A tensile force was applied to the fiber until failure, from which the fiber strength was determined based on the fiber diameter and breaking stress. The test was done at room temperature under the controlled humidity between 40-45% RH. The average values were computed based on a sample size of 65-72 fibers for each composition.

Table 1 above reports the average tensile strengths for fibers formed from the compositions of Examples 1-9. Tensile strengths ranged from 3353 to 3751 MPa for fibers formed from the compositions of Examples 1-9. Specific strengths were calculated by dividing the tensile strength values (in $N/m^2$) by the corresponding specific weights (in $N/m^3$). The specific strengths of the fibers made from the compositions of Examples 1-9 ranged from 13.24-14.82×$10^4$ m. For comparison, a ten micron E-glass fiber was measured as having a fiber density of 2.659 $g/cm^3$, a tensile strength of 3076 MPa, and a specific strength of 12.2×$10^4$ m. Thus, fibers made from the compositions of Examples 1-9 have tensile strengths that are 9-22% higher than the tensile strength of an E-glass fiber and a specific strength improvement over the E-glass fiber of 8-21%.

Young's modulus was also measured for certain glass compositions in Table 1 using the following technique. Approximately 50 grams of glass cullet having a composition corresponding to the appropriate Example in Table 1 was re-melted in a 90Pt/10Rh crucible for two hours at a melting temperature defined by 100 Poise. The crucible was subsequently transferred into a vertical tube, electrically heated furnace. The furnace temperature was preset at a fiber pulling temperature close or equal to a 1000 Poise melt viscosity. The glass was equilibrated at the temperature for one hour before fiber drawing. The top of the fiber drawing furnace had a cover with a center hole, above which a water-cooled copper coil was mounted to regulate the fiber cooling. A silica rod was then manually dipped into the melt through the cooling coil, and a fiber about 1-1.5 m long was drawn out and collected. The diameter of the fiber ranged from 100μ at one end to 1000 μm at the other end.

Elastic moduli were determined using an ultrasonic acoustic pulse technique (Panatherm 5010 unit from Panametrics, Inc. of Waltham, Mass.) for the fibers drawn from the glass melts. Extensional wave reflection time was obtained using twenty micro-second duration, 200 kHz pulses. The sample length was measured and the respective extensional wave velocity ($V_E$) was calculated. Fiber density (ρ) was measured using a Micromeritics AccuPyc 1330 pycnometer. About 20 measurements were made for each composition and the average Young's modulus (E) was calculated from the following formula:

$$E = V_E^2 \times \rho$$

The modulus tester uses a wave guide with a diameter of 1 mm, which sets the fiber diameter at the contact side with the wave guide to be about the same as the wave guide diameter. In other words, the end of the fiber having a diameter of 1000 μm was connected at the contact side of the wave guide. Fibers with various diameters were tested for Young's modulus and the results show that a fiber diameter from 100 to 1000 μm does not affect fiber modulus.

Young's modulus values ranged from 83.17 to 86.53 GPa for fibers formed from the compositions in Table 1. Specific modulus values were calculated by dividing the Young's modulus values by the corresponding densities. The specific moduli of the fibers made from the compositions of Examples 1 and 5-9 ranged from 3.34-3.41×$10^6$ m. For comparison, an E-glass fiber was measured (using the same procedure as above) as having a fiber density of 2.602 $g/cm^3$, a modulus of 80.54 GPa, and a specific modulus of 3.16×$10^6$ m. Thus, fibers made from the compositions of Examples 1 and 5-9 have moduli that are 3-7% higher than the modulus of an E-glass fiber and a specific modulus improvement over the E-glass fiber of 5-8%.

Examples 12-22

Examples 12-22 were prepared on a conventional furnace for melting glass compositions to form fiber glass. The glass batch was made from conventional batch materials (e.g., sand, clay, limestone, etc.). Samples of molten glass were removed from the furnace and allowed to solidify. The composition of the glass was then determined using calibrated x-ray fluorescence, with the exception of the $Li_2O$ content, which was determined by conventional wet analysis. The other properties reported in Table 2 below were determined using the same techniques as described above in connection with Examples 1-11 (including the methods by which the fiber samples were prepared and the diameter range of the fibers) except that the glass samples from the conventional furnace were used as the source of glass for the fibers.

$3.41$-$3.49 \times 10^6$ m. For comparison, an E-glass fiber was measured (using the same procedure as above) as having a fiber density of 2.602 $g/cm^3$, a modulus of 80.54 GPa, and a specific modulus of $3.16 \times 10^6$ m. Thus, fibers made from the compositions of Examples 12-22 have moduli that are 9-10.6% higher than the modulus of an E-glass fiber and a specific modulus improvement over the E-glass fiber of 8-10%.

Desirable characteristics, which can be exhibited by embodiments of the present invention, can include, but are not limited to, the provision of new glass compositions that

TABLE 2

| | 12 | 13 | 14 | 15 | 16 | 17 | 18 | 19 | 20 | 21 | 22 |
|---|---|---|---|---|---|---|---|---|---|---|---|
| $SiO_2$ | 60.32 | 60.31 | 60.17 | 60.25 | 60.12 | 60.27 | 60.39 | 60.70 | 60.84 | 60.79 | 60.86 |
| $Al_2O_3$ | 14.50 | 14.76 | 14.86 | 14.98 | 15.02 | 15.09 | 15.11 | 15.17 | 15.20 | 15.19 | 15.19 |
| CaO | 17.36 | 16.64 | 16.47 | 16.14 | 16.03 | 15.83 | 15.58 | 15.44 | 15.51 | 15.54 | 15.52 |
| MgO | 6.06 | 6.52 | 6.65 | 6.87 | 6.97 | 7.09 | 7.12 | 6.80 | 6.72 | 6.71 | 6.71 |
| $Na_2O$ | 0.06 | 0.06 | 0.06 | 0.06 | 0.06 | 0.07 | 0.07 | 0.08 | 0.08 | 0.08 | 0.08 |
| $K_2O$ | 0.08 | 0.08 | 0.08 | 0.08 | 0.08 | 0.09 | 0.09 | 0.09 | 0.09 | 0.09 | 0.09 |
| $Li_2O$ | 0.00 | 0.00 | 0.00 | 0.00 | 0.51 | 0.54 | 0.62 | 0.67 | 0.70 | 0.71 | 0.70 |
| $B_2O_3$ | 0 | 0 | 0 | 0 | 0 | 0 | 0 | 0 | 0 | 0 | 0 |
| $Fe_2O_3$ | 0.27 | 0.26 | 0.26 | 0.26 | 0.26 | 0.26 | 0.26 | 0.26 | 0.26 | 0.27 | 0.27 |
| $F_2$ | | | | | | | | | | | |
| $TiO_2$ | 0.48 | 0.48 | 0.47 | 0.47 | 0.47 | 0.47 | 0.46 | 0.45 | 0.45 | 0.45 | 0.45 |
| $ZrO_2$ | | | | | | | | | | | |
| Other (e.g., $SO_3$) | | | | | | | | | | | |
| MgO + CaO | 23.42 | 23.16 | 23.12 | 23.01 | 23.00 | 22.92 | 22.70 | 22.24 | 22.23 | 22.25 | 22.23 |
| CaO/MgO | 2.86 | 2.55 | 2.48 | 2.35 | 2.30 | 2.23 | 2.19 | 2.27 | 2.31 | 2.32 | 2.31 |
| $R_2O$ | 0.14 | 0.14 | 0.14 | 0.14 | 0.65 | 0.70 | 0.78 | 0.84 | 0.87 | 0.88 | 0.87 |
| Properties | | | | | | | | | | | |
| $T_L$ (° C.) | 1214 | 1213 | 1213 | 1213 | 1211 | 1211 | 1207 | 1204 | 1203 | 1204 | 1204 |
| $T_F$ (° C.) | 1270 | 1270 | 1269 | 1270 | 1269 | 1268 | 1268 | 1275 | 1273 | 1272 | 1270 |
| $T_F - T_L$ (° C.) | 56 | 57 | 56 | 57 | 58 | 57 | 61 | 71 | 70 | 68 | 66 |
| Density ($g/cm^3$) | 2.63 | 2.63 | 2.63 | 2.62 | 2.62 | 2.62 | 2.62 | 2.60 | 2.61 | 2.61 | 2.61 |
| Strength (MPa) | 3373 | | | | | | 3597 | | | | 3632 |
| Specific Strength ($10^4$ m) | 13.1 | | | | | | 14.00 | | | | 14.19 |
| Modulus (GPa) | 87.93 | 88.38 | 87.90 | 88.10 | 87.90 | 88.02 | 88.58 | 88.86 | 88.86 | 88.82 | 89.11 |
| Specific Modulus ($10^6$ m) | 3.41 | 3.43 | 3.41 | 3.43 | 3.42 | 3.43 | 3.45 | 3.49 | 3.47 | 3.47 | 3.48 |

Table 2 above reports the average tensile strengths for fibers formed from the compositions of Examples 12, 18, and 22. Tensile strengths ranged from 3373 to 3632 MPa. Specific strengths were calculated by dividing the tensile strength values (in $N/m^2$) by the corresponding specific weights (in $N/m^3$). The specific strengths of the fibers made from the compositions of Examples 12, 18, and 22 ranged from 13.1-$14.19 \times 10^4$ m. For comparison, a ten micron E-glass fiber was measured as having a fiber density of 2.659 $g/cm^3$, a tensile strength of 3076 MPa, and a specific strength of $12.2 \times 10^4$ m. Thus, fibers made from the compositions of Examples 12, 18, and 22 have tensile strengths that are 9-18% higher than the tensile strength of an E-glass fiber and a specific strength improvement over the E-glass fiber of 7-16%.

Young's modulus values were measured for fibers formed from the compositions in Table 2 using the same procedure described in connection with Table 1. Young's modulus values ranged from 87.90 to 89.11 GPa for fibers formed from the compositions in Table 2. Specific modulus values were calculated by dividing the Young's modulus values by the corresponding densities. The specific moduli of the fibers made from the compositions of Examples 12-22 ranged from exhibit desirable properties; the provision of new glass compositions that can be used to produce glass fibers having desirable mechanical properties; the provision of new glass compositions that can be used to produce glass fibers at commercially acceptable forming temperatures; the provision of new glass compositions that demonstrate desirable differences in liquidus and forming temperatures; and others.

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention.

That which is claimed:

1. A glass composition comprising:
   60-62 weight percent $SiO_2$;
   14-17 weight percent $Al_2O_3$;

14-17.5 weight percent CaO;
6-<8.75 weight percent MgO; and
0-1 weight percent $TiO_2$;
wherein the amount of $Na_2O$ is 0.09 weight percent or less, the CaO/MgO ratio on a weight percent basis is greater than 2.0, and the glass composition is substantially free of $B_2O_3$.

2. The glass composition of claim 1, wherein the glass composition is substantially free of $Na_2O$.

3. The glass composition of claim 1, wherein the (MgO+CaO) content is greater than 21.5 weight percent.

4. The glass composition of claim 1, further comprising 0-1 weight percent $K_2O$ and 0-2 weight percent $Li_2O$.

5. The glass composition of claim 4, wherein the ($Na_2O+K_2O+Li_2O$) content is less than 1 weight percent.

6. The glass composition of claim 1, wherein the glass composition is fiberizable, has a liquidus temperature of less than 1250° C., and has a forming temperature of less than 1300° C., wherein the difference between the forming temperature and the liquidus temperature is at least 50° C.

7. The glass composition of claim 1, further comprising at least one rare earth oxide in an amount between about 0.1 and 3.0 weight percent.

8. A glass fiber formed from the glass composition of claim 1.

9. The glass fiber of claim 8, wherein the glass fiber has a Young's modulus greater than 80 GPa.

10. The glass fiber of claim 8, wherein the glass fiber has a Young's modulus greater than 85 GPa.

11. The glass fiber of claim 8, wherein the glass fiber has a Young's modulus greater than 87 GPa.

12. A glass composition comprising:
60-62 weight percent $SiO_2$;
14.5-16 weight percent $Al_2O_3$;
14.5-17.5 weight percent CaO;
6-7.5 weight percent MgO; and
0-1 weight percent $TiO_2$;
wherein the amount of $Na_2O$ is 0.09 weight percent or less, the CaO/MgO ratio on a weight percent basis is greater than 2.0, and the glass composition is substantially free of $B_2O_3$.

13. The glass composition of claim 12, wherein the glass composition is substantially free of $Na_2O$.

14. The glass composition of claim 12, wherein the (MgO+CaO) content is greater than 21.5 weight percent.

15. The glass composition of claim 12, further comprising 0-1 weight percent $K_2O$ and 0-2 weight percent $Li_2O$, and wherein the ($Na_2O+K_2O+Li_2O$) content is less than 1 weight percent.

16. The glass composition of claim 12, wherein the glass composition is fiberizable, has a liquidus temperature of less than 1250° C., has a forming temperature of less than 1300° C., and wherein the difference between the forming temperature and the liquidus temperature is at least 50° C.

17. The glass composition of claim 12, further comprising at least one rare earth oxide in an amount between about 0.1 and 3.0 weight percent.

18. A glass fiber formed from the glass composition of claim 12.

19. The glass fiber of claim 18, wherein the glass fiber has a Young's modulus greater than 80 GPa.

* * * * *